(12) United States Patent
Lee et al.

(10) Patent No.: US 8,273,141 B2
(45) Date of Patent: Sep. 25, 2012

(54) FUEL REFORMING APPARATUS AND MANUFACTURING METHOD THEREOF

(75) Inventors: Sung-Chul Lee, Suwon-si (KR); Ju-Yong Kim, Suwon-si (KR); Chan-Ho Lee, Suwon-si (KR); Man-Seok Han, Suwon-si (KR); Yong-Kul Lee, Suwon-si (KR); Dong-Myung Suh, Suwon-si (KR); Dong-Uk Lee, Suwon-si (KR); Jin-Kwang Kim, Suwon-si (KR); Jin-Goo Ahn, Suwon-si (KR); Leonid Gorobinskiy, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 785 days.

(21) Appl. No.: 11/700,866

(22) Filed: Feb. 1, 2007

(65) Prior Publication Data

US 2007/0183947 A1     Aug. 9, 2007

(30) Foreign Application Priority Data

Feb. 3, 2006     (KR) .................. 10-2006-0010565

(51) Int. Cl.
*B01J 8/00* (2006.01)
*B01J 10/00* (2006.01)

(52) U.S. Cl. .................... 48/197 R; 422/601

(58) Field of Classification Search ..... 48/197 R–197 A, 48/127.1
See application file for complete search history.

(56) References Cited

U.S. PATENT DOCUMENTS

| | | | |
|---|---|---|---|
| 6,294,138 B1 * | 9/2001 | von Hippel et al. | 422/200 |
| 2004/0136902 A1 * | 7/2004 | Plath et al. | 423/651 |
| 2004/0168367 A1 * | 9/2004 | Suenaga et al. | 48/127.9 |
| 2005/0252002 A1 | 11/2005 | Lee | |
| 2005/0252081 A1 | 11/2005 | Kim | |
| 2005/0284022 A1 * | 12/2005 | Lim | 48/61 |
| 2006/0051260 A1 * | 3/2006 | Yagi et al. | 422/198 |

FOREIGN PATENT DOCUMENTS

| | | |
|---|---|---|
| EP | 0735602 A2 | 10/1996 |
| JP | 02-298901 | 12/1990 |
| JP | 06-111838 | 4/1994 |
| JP | 11-292930 | 10/1999 |

(Continued)

OTHER PUBLICATIONS

Extended European search report dated Oct. 30, 2009, corresponding to European Patent Application No. 07101636.4.

(Continued)

*Primary Examiner* — Imran Akram
(74) *Attorney, Agent, or Firm* — Robert E. Bushnell, Esq.

(57) ABSTRACT

A fuel reforming apparatus including reaction substrates is provided. The reaction substrates of the present invention is made of stainless steel, nickel steel, or chromium steel. Each of the reaction substrates has a channel formed on the surface of the reaction substrate. Reactant for oxidation reaction or for fuel reforming reaction flow through the channel. A catalyst containing layer is formed on the surface of the channel by directly oxidizing the surface of the channel. Therefore, the catalyst containing layer is formed with oxidized steel. A catalyst layer is formed on the catalyst containing layer. A pair of substrates can be laminated to make one substrate a thermal source unit and another a reforming reaction unit.

3 Claims, 9 Drawing Sheets

FOREIGN PATENT DOCUMENTS

| | | |
|---|---|---|
| JP | 11-326623 | 11/1999 |
| JP | 11-349631 | 12/1999 |
| JP | 2000-105456 | 4/2000 |
| JP | 2001-194797 | 7/2001 |
| JP | 2002-143675 | 5/2002 |
| JP | 2004-331434 A | 11/2004 |
| JP | 2005-047794 | 2/2005 |
| JP | 2005-047794 A | 2/2005 |
| JP | 2005-066509 A | 3/2005 |
| JP | 2005-327729 | 11/2005 |
| JP | 2005-327732 | 11/2005 |
| JP | 2006-012817 | 1/2006 |
| KR | 1020000012118 | 2/2000 |
| KR | 1020000058201 | 9/2000 |
| KR | 1020030071929 | 9/2003 |
| KR | 1020080057118 | 6/2008 |
| WO | WO 2004069738 A1 * | 8/2004 |

OTHER PUBLICATIONS

Office action from the Japanese Patent Office issued in Applicant's corresponding Japanese Patent Application No. 2007-024385 dated Apr. 6, 2010 with Request for Entry of the Accompanying Office Action for the Japanese Office action attached herewith.

Japanese Office Action issued by Japanese Patent Office on Mar. 8, 2011 in corresponding Japanese Patent Application No. 2007-024385, together with Request for Entry of the Accompanying Office Action.

European Office Action issued on Jan. 30, 2012 in the corresponding European Patent Application Serial No. 07101636.4-2119, which also claims Korean Patent Application Serial No. 10-2006-0010565 as its priority document.

European Office Action issued on Aug. 29, 2011 by the European Patent Office, in Applicant's corresponding European Patent application No. 07101636.4-2119.

* cited by examiner

FUEL REFORMING APPARATUS AND MANUFACTURING METHOD THEREOF

CLAIM OF PRIORITY

This application makes reference to, incorporates the same herein, and claims all benefits accruing under 35 U.S.C. §119 from an application for APPARATUS FOR REFORMING FUEL AND MANUFACTURING METHOD OF THE SAME earlier filed in the Korean Intellectual Property Office on the 3$^{rd}$ of Feb. 2006 and there duly assigned Serial No. 10-2006-0010565.

BACKGROUND OF THE INVENTION

1. Field of the Invention

The present invention relates to a fuel reforming apparatus, and more particularly, to a fuel reforming apparatus and a manufacturing method of the fuel reforming apparatus in which thermal energy is generated through an oxidation reaction of a fuel and a reformed gas containing hydrogen is generated through a reforming reaction of the fuel by using the thermal energy.

2. Description of the Related Art

A fuel cell is an electricity generating system for generating electrical energy by using a hydrocarbon fuel. Fuel cells can be classified into a polymer electrolyte membrane fuel cell and a direct oxidation membrane fuel cell, which is generally referred to as a direct methanol fuel cell (DMFC) in the art.

The polymer electrolyte membrane fuel cell has an excellent output characteristic, a low operation temperature, and fast starting and response characteristics in comparison to other types of fuel cells. In addition, the polymer electrolyte membrane fuel cell has an advantage that the fuel cell can be used in a wide range of applications such as a mobile power source for vehicles, a distributed power source for home or buildings, and a small size power source for electronic apparatuses.

The fuel cell system employing the polymer electrolyte membrane fuel cell includes a fuel cell main body that can be referred to as a stack, a fuel reforming apparatus which reforms a fuel to generate a reformed gas containing hydrogen and supplies the reformed gas to the stack, and an oxidant gas supply unit which supplies oxidant gas to the stack. The stack generates electricity through an electrochemical reaction of the reformed gas, which is supplied from the fuel reforming apparatus, and the oxidant gas, which is supplied from the oxidant gas supply unit.

In the fuel cell system employing the polymer electrolyte membrane fuel cell, the fuel reforming apparatus includes a thermal source unit which generates thermal energy through an oxidation reaction induced by an oxidation catalyst, and a reforming reaction unit which generates a reformed gas containing hydrogen by the use of the thermal energy and through a reforming reaction of the fuel.

For example, in a fuel reforming apparatus, a plurality of substrates made of stainless steel (SUS) are laminated so as to form a thermal source unit and a reforming reaction unit. The substrates are provided with a channel through which a fuel flows, a catalyst containing layer which is formed on a surface of the channel, and a catalyst layer which is formed on the catalyst containing layer to promote an oxidation reaction of the thermal source unit and a reforming reaction of the reforming reaction unit. The catalyst containing layer supports a catalyst layer, and is made of aluminum oxide ($Al_2O_3$) that can be formed over the surface of the channel.

In a fuel reforming apparatus, thermal energy is generated through an oxidation reaction of a gaseous fuel such as butane that can be easily obtained in the market. A reformed gas is generated through a reforming reaction of the gaseous fuel and by the use of the thermal energy.

In a fuel reforming apparatus that uses a gaseous fuel, a reforming reaction of the gaseous fuel occurs in the reforming reaction unit at a temperature in a range of 600° C. to 800° C. The thermal energy that is necessary to maintain the temperature is provided by a thermal source unit, which generates the thermal energy through an oxidation reaction of the gaseous fuel. The thermal source unit then supplies the thermal energy to the reforming reaction unit. In order to make the fuel reforming apparatus, a plurality of substrates having channels are laminated, and the laminated substrates bond at a high temperature (in a range of 500° C. to 900° C.).

However, the fuel reforming apparatus has a problem. The catalyst containing layer formed on the channels of the substrates is peeled off along with the catalyst layer or changes its phase during the bonding process at high temperature. Thus, durability of the catalyst containing layer deteriorates with time, which causes a shorter lifespan of the fuel reforming apparatus and degradation in the reliability of the fuel reforming apparatus.

Furthermore, the fuel reforming apparatus is manufactured by separately coating the channels with catalyst containing layer material such as aluminum oxide ($Al_2O_3$), which makes the manufacturing process of the fuel reforming apparatus more complicated. Accordingly, productivity of manufacturing the fuel reforming apparatus deteriorates.

SUMMARY OF THE INVENTION

The present invention provides a fuel reforming apparatus that can solve the problems described above. The reforming apparatus of the present invention is made by directly oxidizing the channel formed on the substrate. Therefore, the reforming apparatus of the present invention causes no damage during high temperature bonding process or high temperature operation of the fuel reforming apparatus. Reliability of the fuel reforming apparatus of the present invention is accordingly improved.

The catalyst containing layer of the fuel reforming apparatus of the present invention is formed by oxidizing the channels of the substrates. Therefore, additional coating process for catalyst containing layer is not necessary, which improves the productivity of manufacturing the fuel reforming apparatus.

The present invention also provides a manufacturing method of the fuel reforming apparatus that can simplify the manufacturing process of the apparatus.

According to an aspect of the present invention, there is provided a fuel reforming apparatus including a reaction substrate made of a metal, a channel formed on an upper surface of the reaction substrate, a support layer formed on the channel where the support layer includes an oxidized layer of the metal and is made by oxidizing the channel, a catalyst layer formed on the support layer, and a cover contacting the upper surface of the reaction substrate.

In the fuel reforming apparatus, the metal can be stainless steel, nickel steel, or chromium steel. The reaction substrate and the cover can be assembled together by a joining member. The fuel reforming apparatus can further includes a path formed in the channel, and the path is sealed by the cover. A reactant can be supplied into the path. The reactant can include butane. The reaction substrate can be a thermal source unit to generate thermal energy or a reforming unit to generate a reformed gas.

According to another aspect of the present invention, there is provided a fuel reforming apparatus including a first reaction substrate made of a first metal, a first channel formed on an upper surface of the first reaction substrate, a first catalyst containing layer formed on the first channel where the first catalyst containing layer includes an oxidized layer of the first metal, a first catalyst layer formed on the first catalyst containing layer, a second reaction substrate made of a second metal and contacting the upper surface of the first reaction substrate, a second channel formed on an upper surface of the second reaction substrate, a second catalyst containing layer formed on the second channel where the second catalyst containing layer includes an oxidized layer of the second metal, a second catalyst layer formed on the second catalyst containing layer, and a cover plate contacting the upper surface of the second reaction substrate.

In the aforementioned aspect of the present invention, each of the first metal and the second metal can be stainless steel, nickel steel, or chromium steel. the first reaction substrate, the second reaction substrate, and the cover plate can be assembled together by a joining member.

The fuel reforming apparatus can further includes a first path formed in the first channel. The first path is sealed by the second reaction substrate, and a first reactant is supplied into the first path. The first reaction substrate can be a thermal source unit to generate thermal energy through an oxidation reaction of the first reactant contained in the first path.

The fuel reforming apparatus can further includes a second path formed in the second channel. The second path is sealed by the cover plate, and a second reactant is supplied into the second path. The second reaction substrate can be a reforming unit to generate a reformed gas through a reforming reaction of the second reactant contained in the second path. The reformed gas can include hydrogen gas. Each of the first reactant and the second reactant can include butane.

According to further still another aspect of the present invention, there is provided a manufacturing method of a fuel reforming apparatus, including steps of preparing a first substrate made of a first metal, forming a first channel on an upper surface of the first substrate, oxidizing an inner surface of the first channel where the oxidized inner surface of the first channel is a first catalyst containing layer, forming a first catalyst layer on the oxidized inner surface of the first channel, preparing a second substrate made of a second metal, forming a second channel on an upper surface of the second substrate, oxidizing an inner surface of the second channel where the oxidized inner surface of the second channel is a second catalyst containing layer, forming a second catalyst layer on the oxidized inner surface of the second channel, placing the second substrate on the upper surface of the first substrate in a manner that a lower surface of the second substrate contacts the upper surface of the first substrate, and placing a cover plate on the upper surface of the second substrate.

The first substrate and the second substrate can be made of stainless steel, nickel steel or chromium steel.

In the aforementioned aspect of the present invention, the step of oxidizing an inner surface of the first channel includes steps of supplying oxygen gas into the first channel, and heating the first channel in temperature range between 500° C. and 700° C.

According to yet another aspect of the present invention, there is provided a manufacturing method of a fuel reforming apparatus, including steps of preparing a first substrate made of a first metal, forming a first channel on an upper surface of the first substrate, preparing a second substrate made of a second metal, forming a second channel on an upper surface of the second substrate, placing the second substrate on the upper surface of the first substrate in a manner that a lower surface of the second substrate contacts the upper surface of the first substrate, placing a cover plate on the upper surface of the second substrate, oxidizing inner surfaces of the first channel and the second channel after both of the step of placing the second substrate and the step of placing a cover plate where the oxidized inner surfaces of the first channel and the second channel are a catalyst containing layer, and forming a catalyst layer on the oxidized inner surfaces of the first channel and the second channel.

The first substrate and the second substrate can be made of stainless steel, nickel steel or chromium steel.

In the aforementioned aspect of the present invention, the step of oxidizing inner surfaces of the first channel and the second channel includes steps of supplying oxygen gas into the first channel and the second channel, and heating the first channel and the second channel in temperature range between 500° C. and 700° C.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE INVENTION

With reference to the accompanying drawings, embodiments of the present invention will be described in order for those skilled in the art to be able to implement it. As those skilled in the art would realize, the described embodiments can be modified in various different ways, all without departing from the spirit or scope of the present invention.

Figure 1:
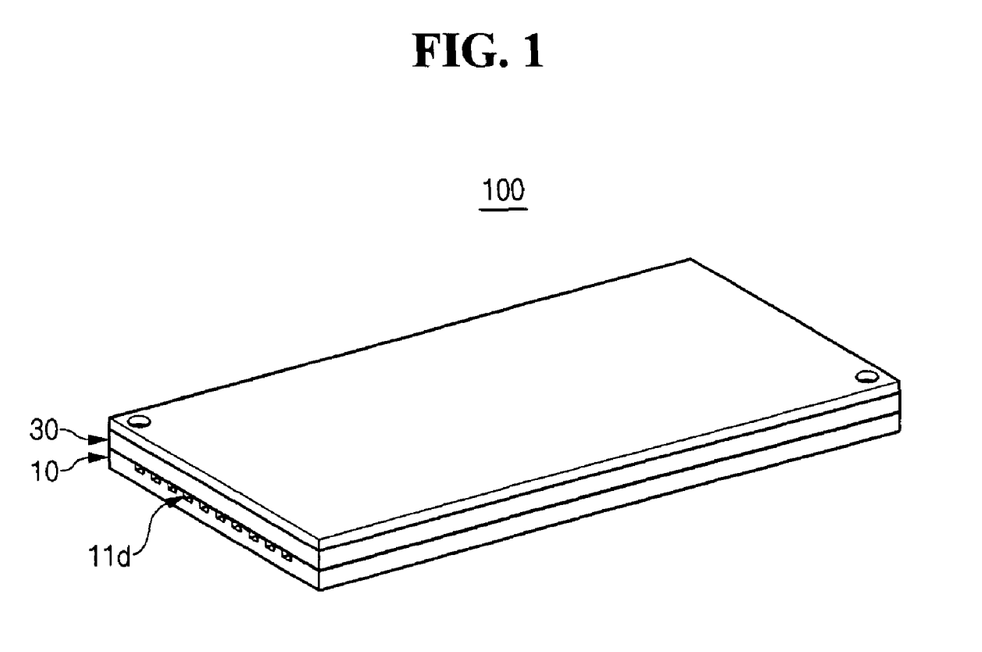
FIG. 1 is a perspective view of a fuel reforming apparatus constructed as a first embodiment of the present invention.

FIG. 1 is a perspective view of a fuel reforming apparatus constructed as a first embodiment of the present invention.

Referring to FIG. 1, fuel reforming apparatus 100 generates a reformed gas through a reforming reaction of a fuel. The reformed gas contains hydrogen gas. Because the reforming reaction of the fuel requires thermal energy, fuel reforming apparatus 100 also generates heat through an oxidation reaction of the fuel. The heat is supplied to activate the reforming reaction of the fuel.

The fuel can be a hydrocarbon fuel in the form of liquid or gas. The hydrocarbon fuel is a fuel that contains hydrogen, which can includes methanol, ethanol, LPG, LNG, and gasoline. Alternatively, the fuel can be a gaseous fuel containing butane as a principal component.

Fuel reforming apparatus 100 is employed in a fuel cell system so as to produce a reformed gas and to supply the reformed gas to a stack of the fuel cell system. The fuel cell system generates electricity through an oxidation reaction of the reformed gas and a reduction reaction of an oxidant gas. The oxidant gas used for the fuel cell system can be oxygen stored in a separate storage, or can be oxygen contained in atmospheric air.

Fuel reforming apparatus 100 includes thermal source unit 10 which generates thermal energy through an oxidation reaction between a gaseous fuel and air (hereinafter, referred to as "first reactant"), and reforming reaction unit 30 which generates a reformed gas through a stream reforming (SR) reaction between a gaseous fuel and water (hereinafter, referred to as "second reactant") and by the thermal energy produced by thermal source unit 10.

Fuel reforming apparatus 100 is a laminate type reforming apparatus in which thermal source unit 10 and reforming reaction unit 30 are laminated together. Thermal source unit 10 generates thermal energy in a range of a predetermined temperature through an oxidation reaction of the first reactant. Then, thermal source unit 10 supplies the thermal energy to reforming reaction unit 30. The thermal energy generated by thermal source unit 10 has temperature in a range of 600° C. to 800° C., which is required temperature for the reforming reaction of the second reactant.

First path 11$d$, along which first reactant flows, is formed in thermal source unit 10. First path 11$d$ will be explained in detail later referring to FIGS. 2 and 3.

Figure 2:
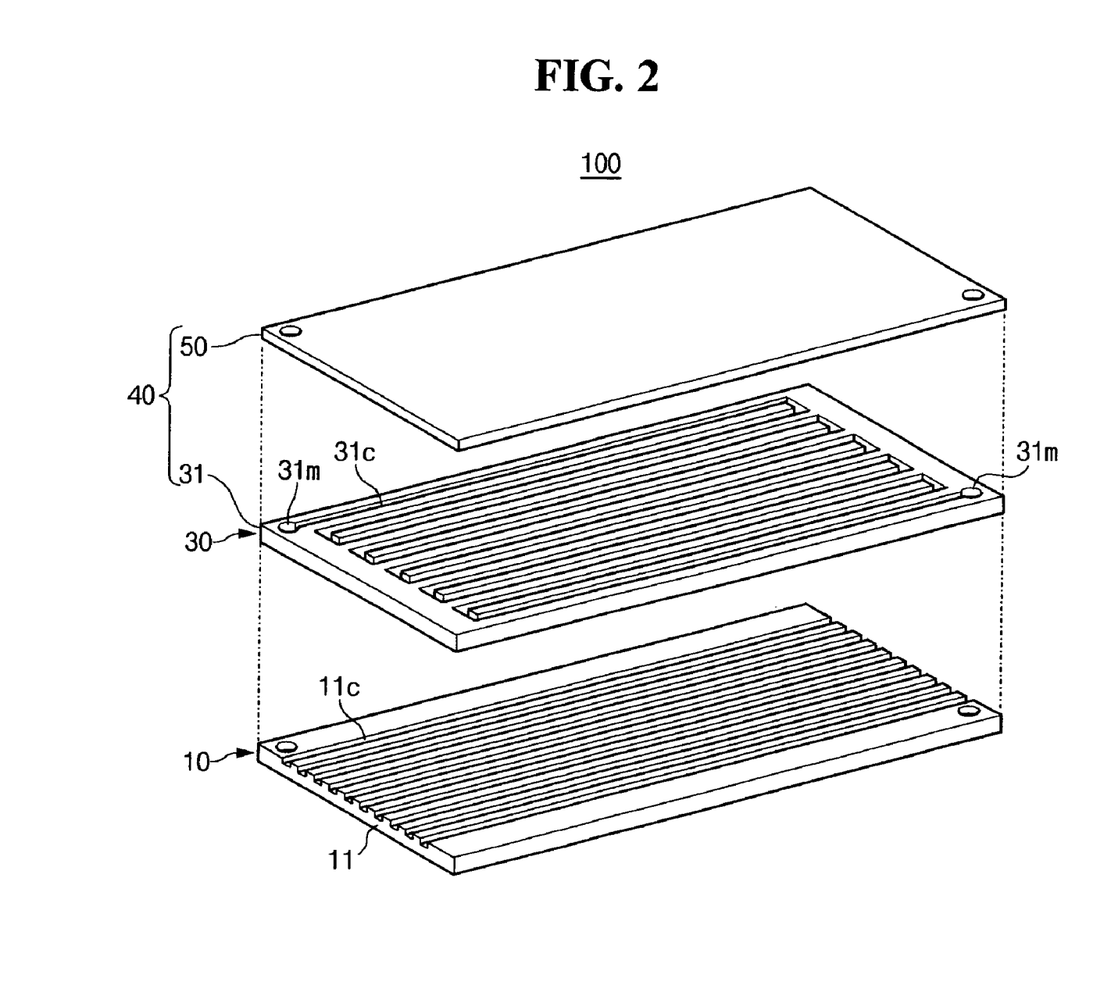
FIG. 2 is an exploded perspective view of the fuel reforming apparatus shown in FIG. 1.
Figure 3:
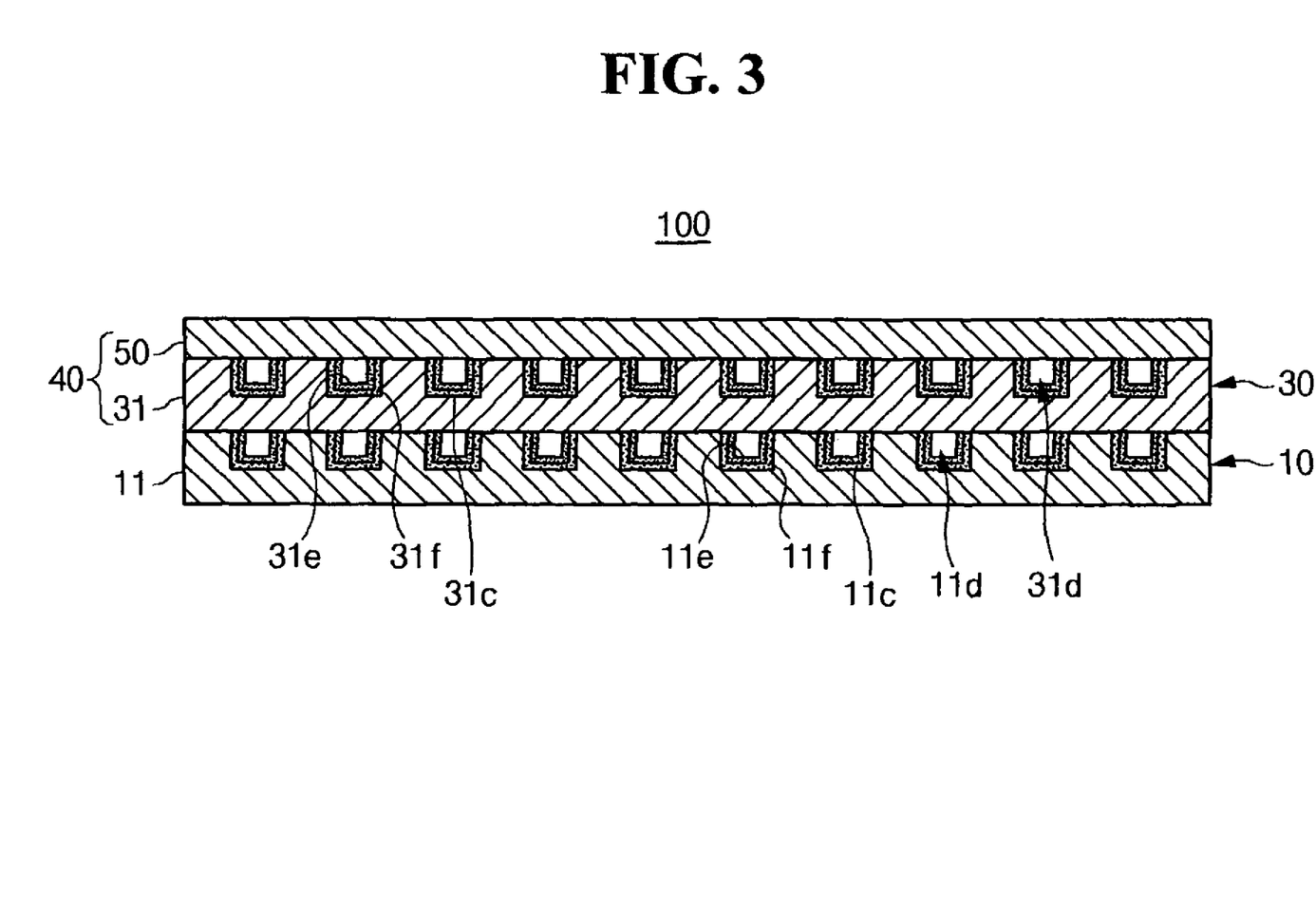
FIG. 3 is a vertical cross-sectional view of the fuel reforming apparatus shown in FIG. 1.

FIG. 2 is an exploded perspective view of the fuel reforming apparatus shown in FIG. 1. FIG. 3 is a vertical cross-sectional view of the fuel reforming apparatus shown in FIG. 1. Referring to FIGS. 2 and 3, thermal source unit 10 includes plate-type first reaction substrate 11. First channel 11$c$ is formed on an upper surface of first reaction substrate 11. First reactant can flow through first channel 11$c$. Reforming reaction unit 30 includes plate-type second reaction substrate 31. Second channel 31$c$ is formed on an upper surface of second reaction substrate 31. Second reactant can flow through second channel 31$c$. Reforming reaction unit 30 is laminated with thermal source unit 10 in a manner that a lower surface of second reaction substrate 31 closely contacts the upper surface of first reaction substrate 11.

Fuel reforming apparatus 100 includes cover 40 which includes the second reaction substrate 31 and a cover plate 50. Cover plate 50 is laminated with second reaction substrate 31 in a manner that cover plate 50 closely contacts the upper surface of second reaction substrate 31.

First path 11$d$ is formed in first channel 11$c$ of first reaction substrate 11, and is the path along which the first reactant flows. Because second reaction substrate 31 closely contacts the upper surface of first reaction substrate 11, the lower surface of second reaction substrate 31 covers first channel 11$c$ and seals first path 11$d$. Therefore, first reactant can flow along first path 11$d$ without a leak. Second path 31$d$ is formed in second channel 31$c$ of second reaction substrate 31.

Because cover plate 50 closely contacts the upper surface of second reaction substrate 31, cover plate 50 covers second channel 31$c$ and seals second path 31$d$. Therefore, second reactant can flow along second path 31$d$ without a leak.

First reaction substrate 11 has a shape of a square plate made of stainless steel (SUS). Multiple first channels 11$c$ can be formed on the upper surface of the first reaction substrate 11 as shown in FIG. 2. In this case, first channels 11$c$ are formed between ribs, which protrude from the upper surface of the first reaction substrate 11 and are aligned parallel to each other in a certain interval. First channel 11$c$ has a shape of a groove which runs from one edge to the other edge of first reaction substrate 11.

First catalyst containing layer 11$f$ is formed in an inner surface of first channel 11$c$, and oxidation catalyst layer (first catalyst layer) 11$e$ is formed on a surface of first catalyst containing layer 11$f$ to promote an oxidation reaction of the first reactant. First catalyst containing layer 11$f$ supports oxidation catalyst layer 11$e$, and also can be referred to as a support layer.

First catalyst containing layer 11$f$ is constructed by oxidizing the inner surface of first channel 11$c$. After the process of oxidization, an oxidized steel film, which is first catalyst containing layer 11$f$, is formed on the inner surface of first channel 11$c$. First catalyst containing layer 11$f$ can be formed with a oxidized steel such as $Fe_2O_3$, $Fe_3O_4$, or FeO.

Second reaction substrate 31 has a shape of a square plate made of stainless steel (SUS). The lower surface of second reaction substrate 31 closely contacts the upper surface of first reaction substrate 11. Second channel 31$c$ is constructed between ribs which protrudes from the upper surface of second reaction substrate 31. As shown in FIG. 2, in this embodiment, second channel 31$c$ is continuously formed from one end to another end, and is not broken in pieces. Each end of second channel 31$c$ is connected to each of holes 31$m$, which are placed at corners of second reaction substrate 31.

Second catalyst containing layer 31$f$ is formed in an inner surface of second channel 31$c$, and reforming catalyst layer (second catalyst layer) 31$e$ is formed on a surface of second catalyst containing layer 31$f$ to promote a reforming reaction of the second reactant. Second catalyst containing layer 31$f$ supports reforming catalyst layer 31$e$, and also can be referred to as a support layer.

Second catalyst containing layer 31$f$ is constructed by oxidizing the inner surface of the second channel 31$c$. After the process of oxidization, an oxidized steel film, which works as second catalyst containing layer 31$f$, is formed on the inner surface of second channel 31$c$. Second catalyst containing layer 31$f$ can be made of oxidized steel such as $Fe_2O_3$, $Fe_3O_4$, or FeO.

As described above, referring to FIGS. 1-3, fuel reforming apparatus 100 includes first reaction substrate 11, second reaction substrate 31, and cover plate 50. These components are laminated to be closely interconnected with each other. However, the present invention is not limited thereto. Thus, first reaction substrate 11 and second reaction substrate 31 can be sequentially laminated to be closely bonded with each other, and cover plate 50 can be closely bonded with the upper surface of second reaction substrate 31.

First reaction substrate 11, second reaction substrate 31, and cover plate 50 can be closely interconnected with each other by means of a joining member such as a bolt and a nut. The joining member means a physical connection device. Alternatively, first reaction substrate 11, second reaction substrate 31, and cover plate 50 can be closely bonded with each other by means of a bonding member such as welding or brazing. The bonding member can be any connection member requiring physical or chemical reaction.

Figure 4:
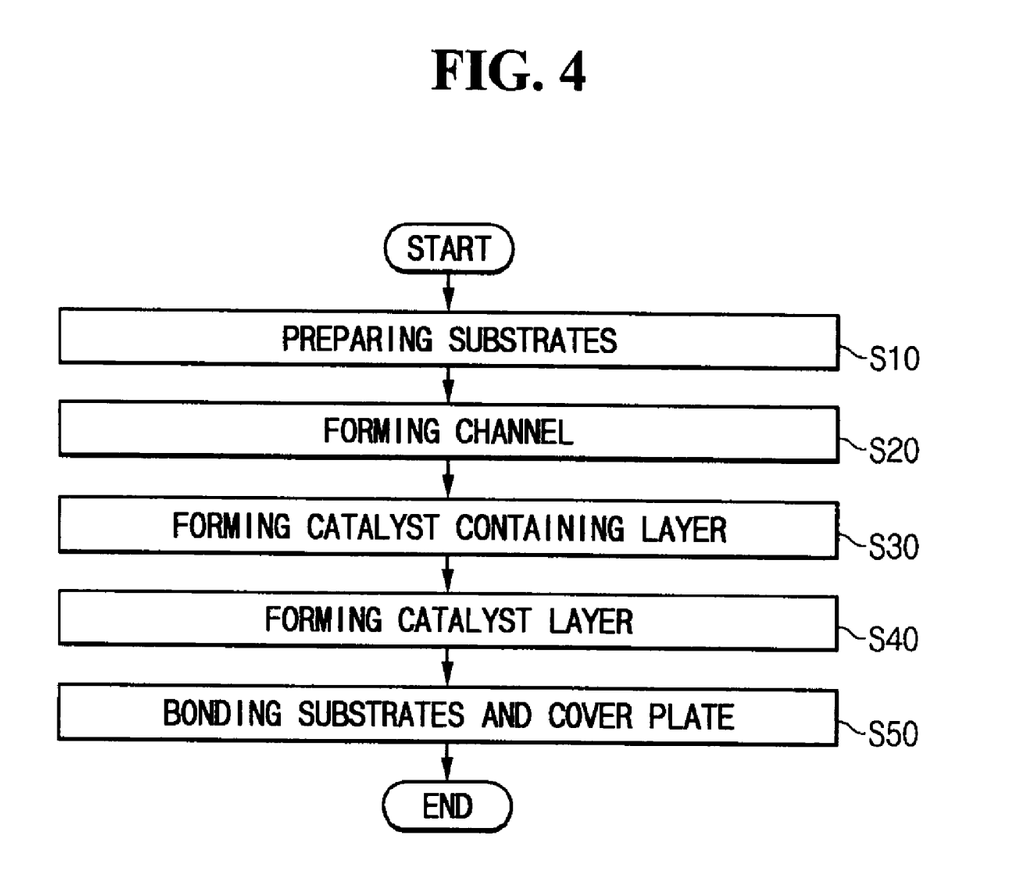
FIG. 4 is a flowchart illustrating a manufacturing method of a fuel reforming apparatus constructed as the first embodiment of the present invention.

FIG. 4 is a flowchart illustrating a manufacturing method of a fuel reforming apparatus constructed as the first embodiment of the present invention. Referring to FIG. 4, the manufacturing method of the fuel reforming apparatus according to the first embodiment of the present invention includes steps of preparing substrates made of stainless steel (step S10), forming a channel by etching an upper surface of each substrate (step S20), forming a catalyst containing layer by oxidizing the inner surface of the channel (step S30), forming a catalyst layer on the catalyst containing layer (step S40), and laminating the substrates with each other and assembling a cover plate on the upper surface of the uppermost substrate (step S50).

Figure 5A:
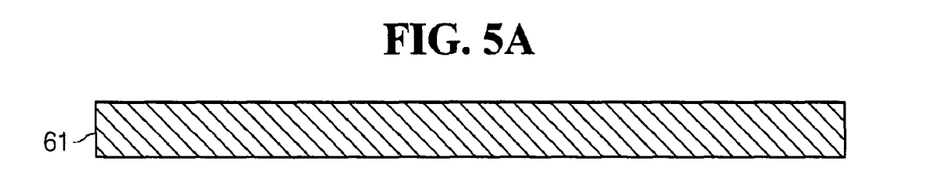
FIGS. 5A to 5E are cross-sectional views for explaining a manufacturing method of the fuel reforming apparatus constructed as the first embodiment of the present invention.
Figure 5B:
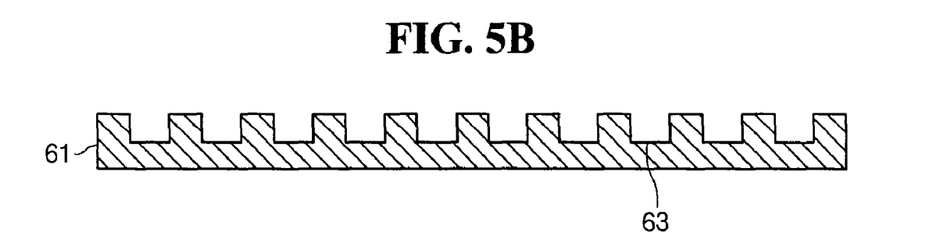

FIGS. 5A to 5E are cross-sectional views for explaining a manufacturing method of the fuel reforming apparatus constructed as the first embodiment of the present invention. Referring to FIG. 5A, which is step S10 of FIG. 4, substrate 61 made of stainless steel is prepared. Referring to FIG. 5B, which is step S20 of FIG. 4, substrate 61 is subjected to an anisotropic etching or isotropic etching process, and channel 63 is formed on the upper surface of substrates 61. Channel 63 has a predetermined width and depth. As a result of the etching process, ribs, which protrude from the upper surface of substrates 61, are formed. The ribs are aligned in a certain interval. Channel 63 is formed in spaces between the ribs.

Figure 5C:
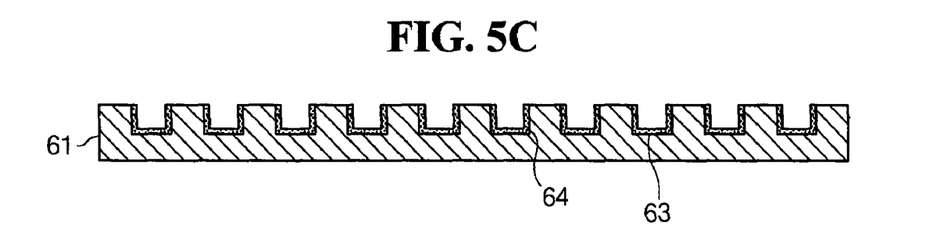

Referring to FIG. 5C, which is step S30 of FIG. 4, an inner surface of channel 63 of substrate 61 is oxidized through a thermal oxidation method at temperature in a range of 500° C. to 900° C. Oxygen or oxidation solution can be used for the oxidation process.

When the inner surface of channel 63 of substrate 61 is oxidized by oxygen or oxidization solution, catalyst containing layer 64 is formed on the inner surface of channel 63. Catalyst containing layer 64 is oxidized steel layer, and can be formed of a material such as $Fe_2O_3$, $Fe_3O_4$, or FeO.

Figure 5D:
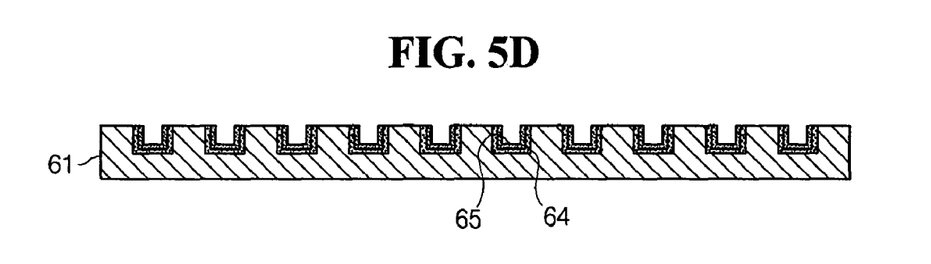

Referring to FIG. 5D, which is step S40 of FIG. 4, catalyst layer 65 is formed on catalyst containing layer 64 by a slurry method. Catalyst layer 65 can include additional layers or additives that promote reactions in thermal source unit and the reforming reaction unit.

Figure 5E:
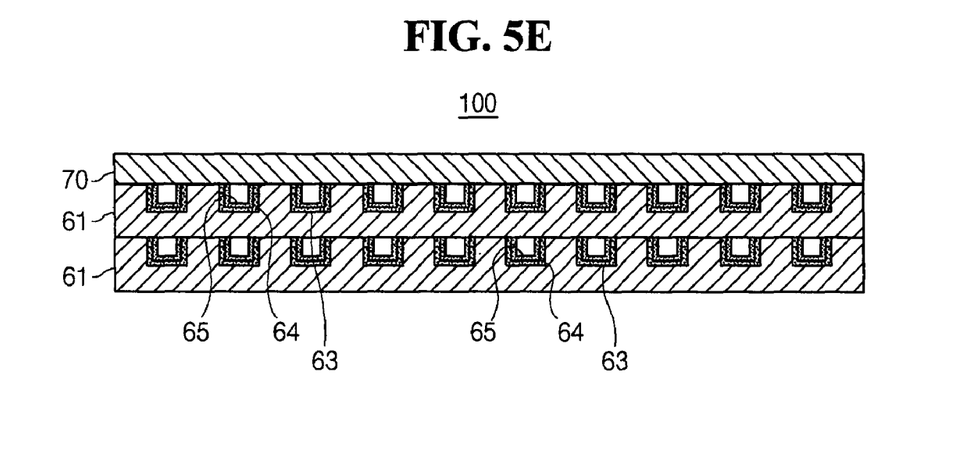

Referring to FIG. SE, which is step S50 of FIG. 4, another identical substrate 61 is manufactured through the aforementioned processes, and two substrates 61 are laminated together. Cover plate 70 is laminated on the upper surface of uppermost substrate 61. Uppermost substrates 61 and cover plate 70 are interconnected to each other. In this stage, manufacturing process of fuel reforming apparatus 100 of the first embodiment of the present invention is completed.

An additional catalyst containing layer such as an aluminum oxide ($Al_2O_3$) layer can be formed on the inner surface of channel 63 of substrate 61 made of stainless steel. This aluminum oxide film, however, could cause problems such as a damage of film during high temperature bonding process of substrates 61 and cover plate 70 or high temperature operation of fuel reforming apparatus. On the other hand, in the present invention, the inner surface of channel 63 is directly oxidized so as to form catalyst containing layer 64 formed with an oxidized steel film. Catalyst layer 65 is formed on catalyst containing layer 64. Accordingly, catalyst containing layer 64 is no longer damaged or peeled off along with catalyst layer 65, or its phase does not change even under the high temperature condition, which is in a range of 600° C. to 800° C., during the operation of the fuel reforming apparatus.

Figure 6:
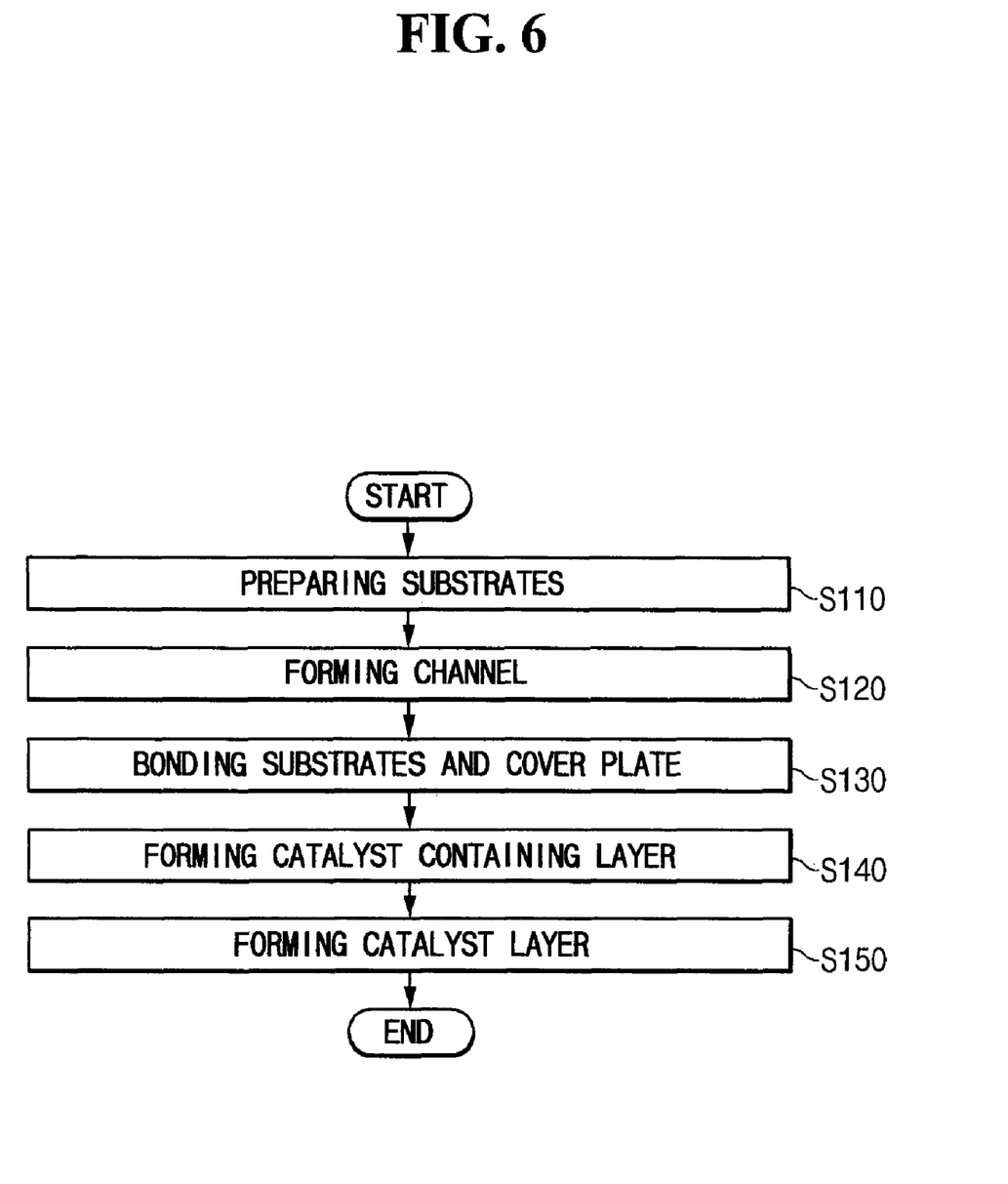
FIG. 6 is a flowchart illustrating a manufacturing method of a fuel reforming apparatus constructed as a second embodiment of the present invention.

FIG. 6 is a flowchart illustrating a manufacturing method of a fuel reforming apparatus constructed as a second embodiment of the present invention. Referring to FIG. 6, the manufacturing method of the fuel reforming apparatus according to the second embodiment of the present invention includes steps of preparing substrates made of stainless steel (step S110), forming a channel by etching the upper surface of each substrate (step S120), bonding the substrates with each other and bonding a cover plate with the upper surface of the uppermost substrate (step S130), forming a catalyst containing layer by oxidizing the inner surface of the channel (step S140), and forming a catalyst layer on the catalyst containing layer (step S150).

Figure 7A:
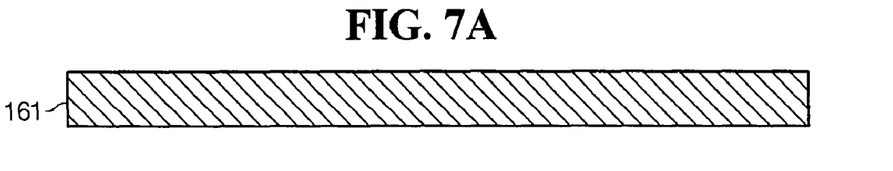
FIGS. 7A to 7E are cross-sectional views for explaining a manufacturing method of the fuel reforming apparatus constructed as the second embodiment of the present invention.
Figure 7B:
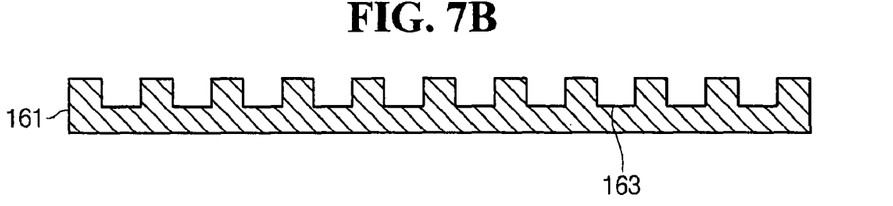

FIGS. 7A to 7E are cross-sectional views for explaining a manufacturing method of the fuel reforming apparatus constructed as the second embodiment of the present invention. Referring to FIGS. 7A to 7B, which is steps S110 and S120 of FIG. 6, respectively, substrate 161 made of stainless steel is prepared. Channel 163 is formed on the upper surfaces of substrates 161.

Figure 7C:
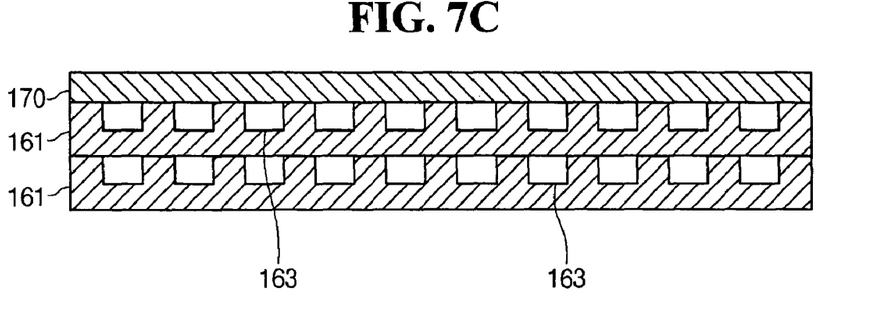

Referring to FIG. 7C, another identical substrate 161 is manufactured through the process shown in FIGS. 7A and 7B. Two substrates 161 are laminated together, and cover plate 170 is laminated on the upper surface of uppermost substrate 161. Uppermost substrate 161 and cover plate 170 are interconnected.

Figure 7D:
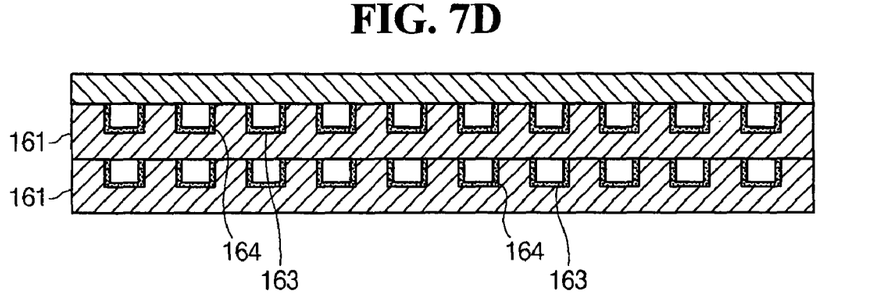

Referring to FIG. 7D, which is step S140 of FIG. 6, the inner surface of channel 163 is oxidized through a thermal oxidation method, in which oxygen or oxidation solution are supplied into channel 163 of each substrate 161 at temperature in a range of about 500° C. to 900° C. In this case, an oxidized steel film, which is catalyst containing layer 164, is formed on the inner surface of channel 163 of each substrate 161. The oxidized steel film formed through a rapid reaction with oxygen at high temperature has excellent corrosion resistance and rigidity. Thus, the oxidized steel film is not easily peeled off from the inner surface of channel 163.

Figure 7E:
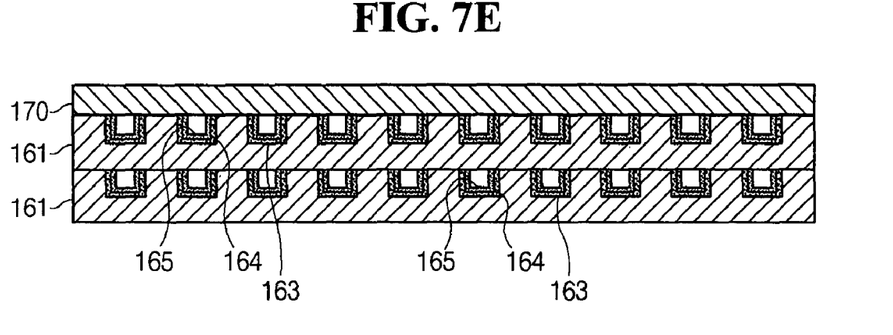

Referring to FIG. 7E, which is step S150 of FIG. 6, catalyst layer 165 is formed on catalyst containing layer 164 by supplying a catalyst material into channel 163 of each substrate 161 by a slurry method or the like. Accordingly, the manufacturing process of the fuel reforming apparatus of the second embodiment of the present invention is completed through the aforementioned series of processes.

Details of the manufacturing processes and operations of the fuel reforming apparatus in this embodiment are the same as those in the first embodiment. Thus, descriptions thereof will be omitted.

Figure 8:
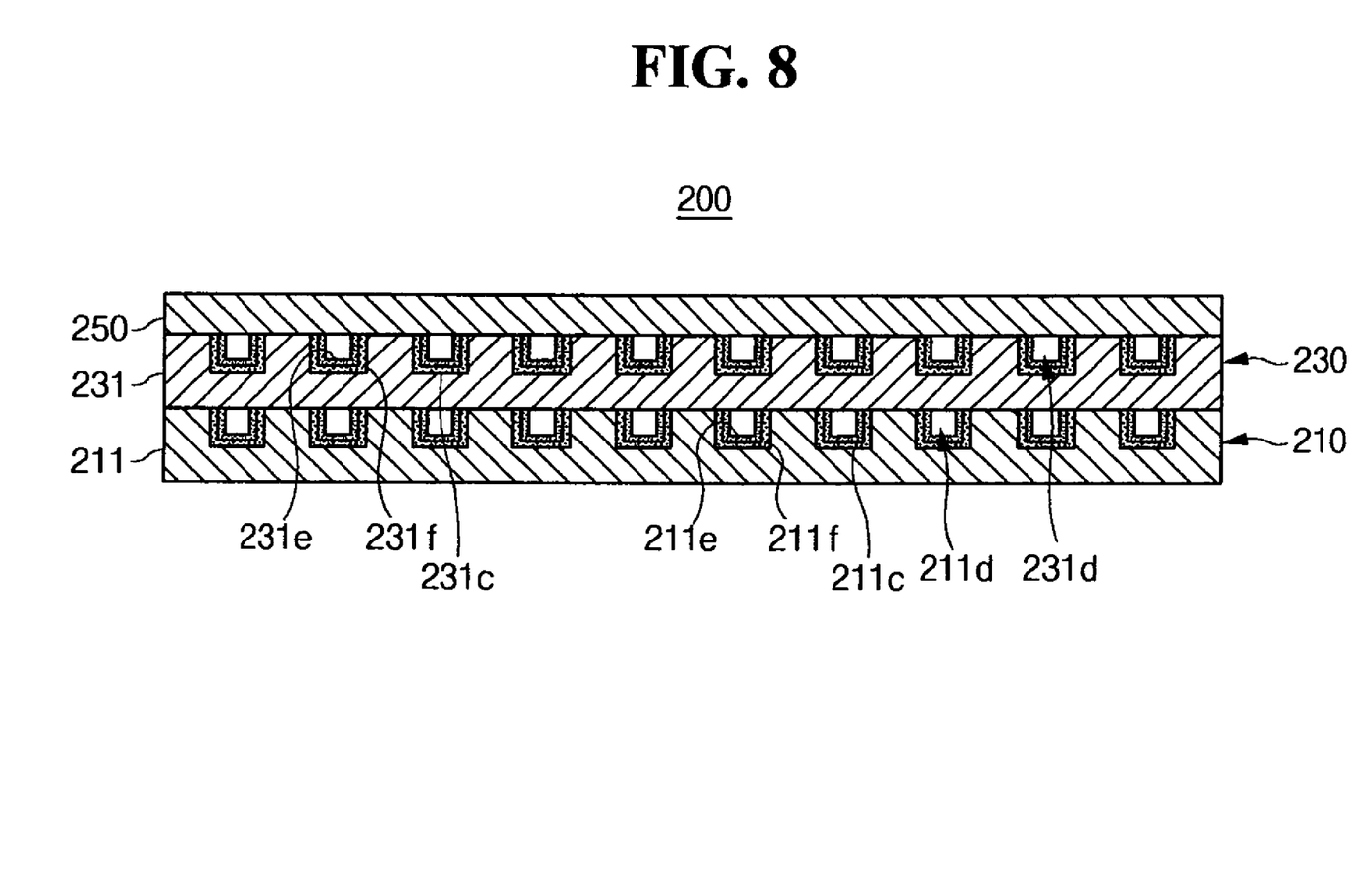
FIG. 8 is a cross-sectional view of a fuel reforming apparatus constructed as a third embodiment of the present invention.

FIG. 8 is a cross-sectional view of a fuel reforming apparatus constructed as a third embodiment of the present invention. Referring to FIG. 8, in the third embodiment, fuel reforming apparatus 200 is constructed by sequentially laminating thermal source unit 210 which generates thermal energy through an oxidation reaction between a gaseous fuel and air, reforming reaction unit 230 which generates a reformed gas by using the thermal energy, and cover plate 250.

Thermal source unit 210 includes plate-type first reaction substrate 211 having first channel 211c, through which fuel and air flow. Reforming reaction unit 230 includes plate-type second reaction substrate 231 having second channel 231c. Reforming reaction unit 230 is closely bonded with the upper surface of first reaction substrate 211, and a gaseous fuel and water flows through second channel 231c.

In fuel reforming apparatus 200, first path 211d is formed in first channel 211c, and is covered by second reaction substrate 231. Second path 231d is formed in second channel 231c, and covered by cover plate 250. According to the third embodiment, first reaction substrate 211 and second reaction substrate 231 have a shape of a square plate made of nickel steel. Nickel is a principal component of nickel steel. Nickel steel in the present invention has a broad meaning including nickel alloy steel.

Oxidation catalyst layer 211e is formed on an inner surface of first channel 211c so as to promote an oxidation reaction. First catalyst containing layer 211f is formed between the inner surface of first channel 211c and oxidation catalyst layer 211e so as to support oxidation catalyst layer 211e. First catalyst containing layer 211f is formed by oxidizing first reaction substrate 211 made of nickel alloy steel. An oxidized steel film made during the oxidization process forms first catalyst containing layer 211f.

Reforming catalyst layer 231e is constructed with the inner surface of second channel 231c formed on second reaction substrate 231. Second catalyst containing layer 231f is formed between the inner surface of second channel 231c and reforming catalyst layer 231e so as to support reforming catalyst layer 231e. Second catalyst containing layer 231f is constructed with an oxide layer which is formed by oxidizing second reaction substrate 231.

Nickel alloy steel can be oxidized by using a thermal oxidization method used in the first embodiment. First catalyst containing layer 211f and second catalyst containing layer 231f are constructed with an oxidized steel film containing a principal component such as $Fe_2O_3$, $Fe_3O_4$, and FeO.

According to the third embodiment, the reaction substrates are made of nickel alloy steel having excellent thermal resistance, thereby increasing the lifespan of each reaction substrate. Furthermore, since the catalyst containing layer is formed on the surface of the channel by oxidizing nickel steel at high temperature, the catalyst containing layer can be prevented from being peeled off or from changing its phase even at high temperature.

Figure 9:
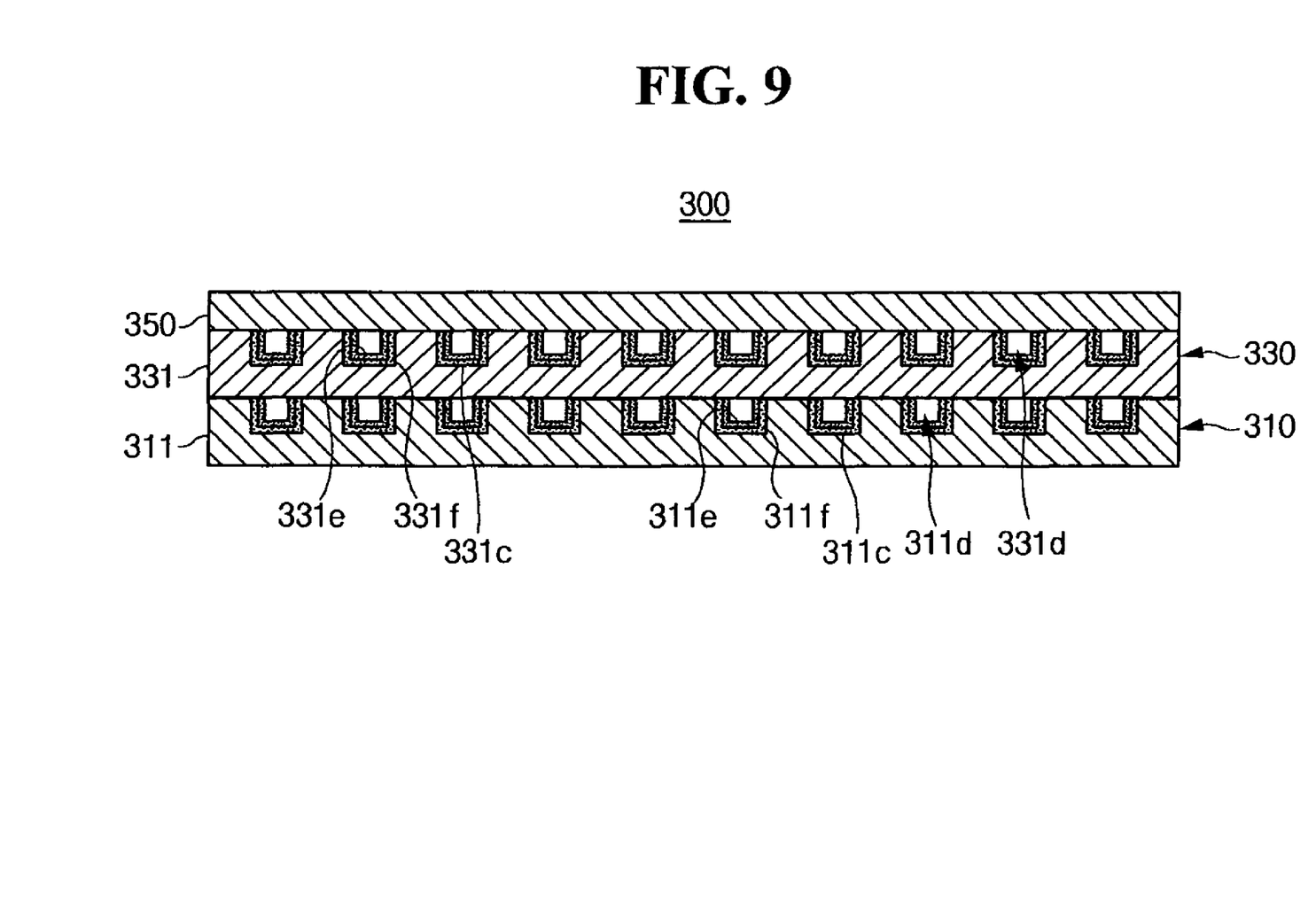
FIG. 9 is a cross-sectional view of a fuel reforming apparatus constructed as a fourth embodiment of the present invention.

FIG. 9 is a cross-sectional view of a fuel reforming apparatus constructed as a fourth embodiment of the present invention. Referring to FIG. 9, in the fourth embodiment, fuel reforming apparatus 300 is constructed by sequentially laminating thermal source unit 310 which generates thermal energy through an oxidation reaction between a gaseous fuel and air, reforming reaction unit 330 which generates a reformed gas by using the thermal energy, and cover plate 350.

Thermal source unit 310 includes plate-type first reaction substrate 311 having first channel 311c through which fuel and air flow. Reforming reaction unit 330 includes plate-type second reaction substrate 331 having second channel 331c. Reforming reaction unit 330 is closely bonded with the upper surface of first reaction substrate 311, and a gaseous fuel and water flow through second channel 331c.

In fuel reforming apparatus 300, first path 311d is formed in first channel 311c, and sealed by second reaction substrate 331. Further, second path 331d is formed in second channel 331c, and sealed by cover plate 350. According to the fourth embodiment, first reaction substrate 311 and second reaction substrate 331 have a shape of a square plate made of chromium steel. Chromium is a principal component of chromium steel, and chromium steel in the present invention has a broad meaning that includes chromium alloy steel.

Oxidation catalyst layer 311e is formed on the inner surface of first channel 311c so as to promote an oxidation reaction. First catalyst containing layer 311f is formed between the inner surface of first channel 311c and oxidation catalyst layer 311e so as to support oxidation catalyst layer 311e. First catalyst containing layer 311f is constructed with an oxide layer which is formed by oxidizing first reaction substrate 311 made of chromium alloy steel.

Reforming catalyst layer 331e is constructed in the inner surface of second channel 331c formed on second reaction substrate 331. Second catalyst containing layer 331f is formed between the inner surface of second channel 331c and reforming catalyst layer 331e so as to support reforming catalyst layer 331e. Second catalyst containing layer 331f is constructed with an oxide layer which is formed by oxidizing second reaction substrate 331.

Chromium alloy steel can be oxidized by using a thermal oxidization method used in the first embodiment. First catalyst containing layer 311f and second catalyst containing layer 331f are constructed with an oxidized steel film containing a principal component such as $Fe_2O_3$, $Fe_3O_4$, and FeO.

According to the fourth embodiment, reaction substrates are made of chromium alloy steel having excellent corrosion resistance, thereby lengthening the lifespan of each reaction substrate. Furthermore, since a catalyst containing layer is formed on a surface of a channel by oxidizing chromium steel at high temperature, the catalyst containing layer can be prevented from being peeled off or from changing its phase even at the high temperature.

According to the present invention, a substrate made of stainless steel, nickel steel, or chromium steel is oxidized so that a catalyst containing layer is formed on a surface of a channel by using oxidized steel. Thus, the catalyst containing layer can be prevented from being peeled off or from changing its phase even at high temperature. Therefore, durability of the catalyst containing layer is improved, thereby not only increasing the lifespan of the fuel reforming apparatus but also further enhancing the reliability of the fuel reforming apparatus. Even though both of the first and the second reaction substrate, in the embodiments, are described as being made of the same metal, each of the first and the second reaction substrate can be made of a different metal material. Each of the metal material also can be referred to as a first metal or a second metal.

In addition, according to the exemplary embodiments of the present invention, when the fuel reforming apparatus is manufactured, a catalyst containing layer is formed by oxidizing a surface of a channel formed on a substrate, which is different from a method of separately forming catalyst containing layer made of a different material from the substrate on a channel of a the substrate. Thus, an overall manufacturing process of the apparatus can be simplified. Accordingly, the productivity of the fuel reforming apparatus can be further improved.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A manufacturing method of a fuel reforming apparatus, comprising steps of:
   preparing a first substrate made of a first metal;
   forming a first channel on an upper surface of the first substrate;
   oxidizing an inner surface of the first channel to form an oxidized inner surface, the oxidized inner surface of the first channel being a first catalyst containing layer, the first catalyst containing layer including one selected from the group consisting of $Fe_2O_3$, $Fe_3O_4$ and FeO;

forming an oxidation catalyst layer on the oxidized inner surface of the first channel to promote an oxidation reaction between a fuel and air, the oxidation catalyst layer completely covering the first catalyst containing layer not to promote the oxidation reaction in the first catalyst containing layer;

preparing a second substrate made of a second metal;

forming a second channel on an upper surface of the second substrate;

oxidizing an inner surface of the second channel, the oxidized inner surface of the second channel being a second catalyst containing layer;

forming a reforming catalyst layer on the oxidized inner surface of the second channel to promote a reforming reaction;

placing the second substrate on the upper surface of the first substrate in a manner that a lower surface of the second substrate contacts the upper surface of the first substrate; and placing a cover plate on the upper surface of the second substrate.

2. The manufacturing method of claim 1, wherein each of the first metal and the second metal is selected from the group consisting of stainless steel, nickel steel, and chromium steel.

3. The manufacturing method of claim 1, comprised of the step of oxidizing an inner surface of the first channel including steps of:

supplying oxygen gas into the first channel; and heating the first channel in temperature range between 500° C. and 700° C.

* * * * *